May 1, 1962 P. B. FONDÉN ETAL 3,032,293
ARRESTING MEANS FOR RETARDING AIRPLANES AND OTHER VEHICLES
Filed Feb. 24, 1958 2 Sheets-Sheet 1

Inventors
Per B. Fondén
Karl O.T. Wälander
by Sommers & Young
Attorneys

United States Patent Office 3,032,293
Patented May 1, 1962

3,032,293
ARRESTING MEANS FOR RETARDING AIRPLANES AND OTHER VEHICLES
Per B. Fonden, Hejdegatan 3, and Karl O. T. Wålander, Vasavagen 49, both of Linkoping, Sweden
Filed Feb. 24, 1958, Ser. No. 717,220
2 Claims. (Cl. 242—156)

The present invention relates to improved means for retarding airplanes and other vehicles by the aid of arresting means, such as arresting nets, cables or the like, said arresting means having one or both ends thereof connected to a brake wire adapted during the arresting action to be unwound from a brake drum controlled by hydraulic or pneumatic brake means.

The main object of the invention is to provide means for delaying the brake action until the inertial forces of the arresting means are substantially neutralized, thereby preventing an excessive retardation of the vehicle at the moment it strikes the arresting net or cables.

A characteristic feature of the invention is the fact that upon a movement of the brake wire valve is opened by a dog operated by said movement for supplying a pressure medium from a pressure source to the brake members in order to obtain a gentle retardation of the vehicle, such as an airplane or a motor car caught by the arresting net or cables.

This and other features and advantages of the invention will more clearly appear from the following description with reference to the embodiments shown on the accompanying drawings.

In the drawings FIG. 1 is a perspective view partially in section of a device according to the invention and FIG. 2 is a fragmentary view of a modified embodiment of cooperating valve control means.

Figure 1:
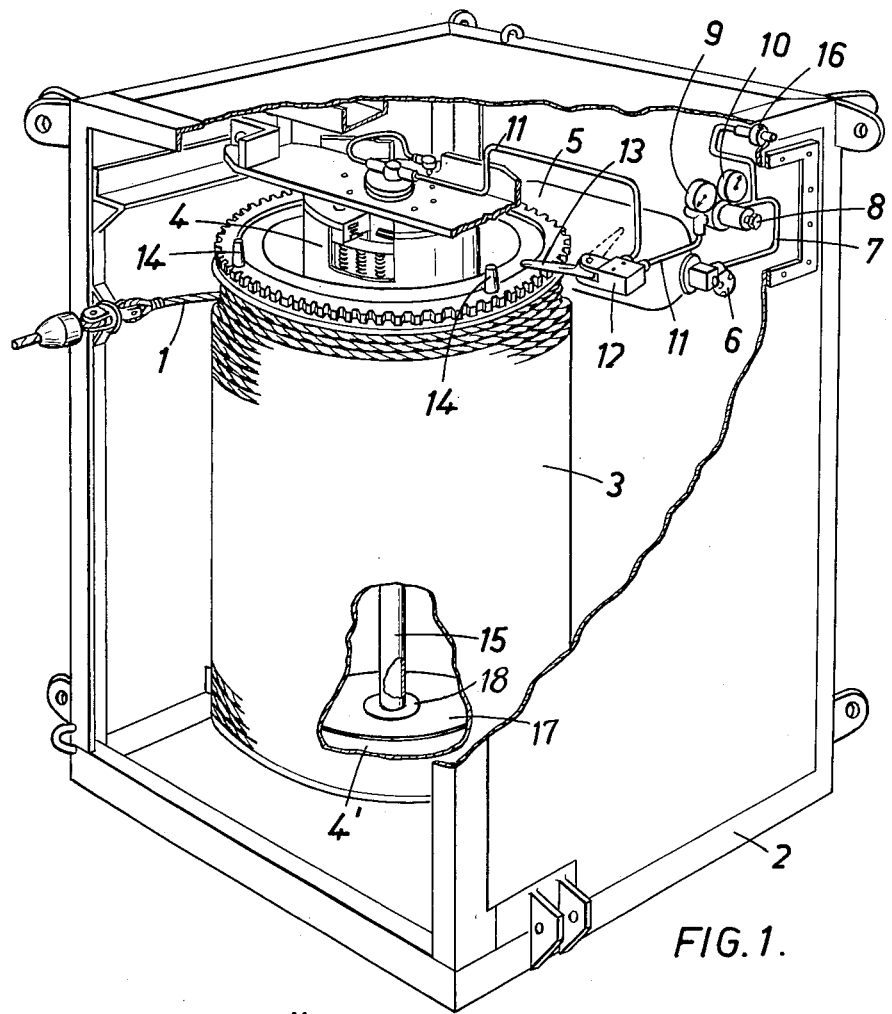

The arresting means are not shown on the drawing as they do not constitute a part of the present invention and may be of any kind well known within the art.

The arresting means, such as an arresting net is connected to a brake wire 1 wound on a brake drum 3 mounted in a brake housing having a supporting frame 2. The drum is rotatably mounted on the stationary hollow shaft 15, which is secured to the frame 2 of the housing as shown in the upper part of FIG. 1. The drum is provided with two disks, one of which is shown at 17 in the lower part of FIG. 1, said disk 17 being rotatably supported by a bearing 18 and for instance, welded to the inner side of the drum. Brakes 4, 4 of any suitable type, such as a plate-compressor brakes or disk brakes are provided at both ends of the drum 3. The upper one 4 of said brakes is shown in a partly sectional view.

The displacement of the plates to and from each other may be effected by pneumatic or hydraulic means. The first mentioned means is selected to illustrate the preferred embodiment shown on the drawings.

The compressed air is kept in a receptable 5 having a shut off valve 6 and a tubing 7 for replenishing the receptacle with compressed air through a valve 16 and draw off compressed air for braking purposes respectively. From the tubing 7 the compressed air is conducted to a pressure reducing valve 8 by means of which suitable braking forces for each type of vehicle to be arrested, such as different types of airplanes, motorcars or the like, may be selected. The pressure reducing valve serves to reduce the high pressure in pressure container 5, to a suitable constant working pressure. The pressure reducing valve is of the well known type usually utilized in compressed gas systems for reducing the high pressure from steel bottles containing air, oxygen, acetylene with high pressure. Such pressure reducing valve may be regulated to give a desired constant pressure at the low pressure side of the valve.

The air in the system may, after a completed working period, be bled out through the bleed opening in the valve 16, said opening being small enough not to affect the function during the rotation of the drum. Pressure gauges 9, 10 indicate the pressure upstream and downstream of the valve 8 respectively. Between said pressure reducing valve 8 and the brakes 4 a conduit 11 is interconnected, said conduit being provided with a valve 12 having an operating lever for closing and opening the same. On the top of the brake drum 3 one or more, for instance three studs or dogs 14 are provided at selected intervals to engage said valve operating lever 13.

The conduit 11 is also connected to a central channel 15 within the brake housing. Said channel 15 is adapted to conduct the compressed air to the lower one 4' of said brakes and serves at the same time as a reservoir for the pressure medium by having such a selected volume as to provide for a uniform increase of the braking action until full braking action is obtained after a suitable period of time. The pressure in the reservoir 15 is proportional to the quantity of air contained therein. The air passes through a relatively narrow conduit and it always takes some time for the air to pass therethrough. As long as the absolute pressure of the air, kept constant by the control of the reduction valve 8, exceeds two times the absolute pressure of the air within the reservoir 15, the air flow through the narrowest section of the conduit is equal to the speed of sound and therefore a constant flow of air is obtained as long as said pressure ratio is maintained. There is a speed above sound speed in the outstreaming flow. When the pressure in the reservoir increases to about 50% of the working pressure regulated by the pressure reducing valve the supply of air decreases at first slowly and then faster to entirely cease when the pressure in the reservoir reaches the value determined by the pressure reducing valve. In this latter phase a flow with a speed below the speed of sound in the streaming gas flow occurs. Since the brakes are connected with the reservoir the braking forces vary in agreement with the pressure in said reservoir.

When the vehicle, such as an airplane is caught by the arresting net, the brake wire 1 tends to unwind from the drum while initiating the rotation of the same. By this rotation the stud 14 strikes the valve operating lever 13 so that the valve 12 is opened and compressed air is conducted to the brakes. As a result the braking action will not start until the vehicle has overcome the inertial forces of the net, of the brake wires and of the brake drum. The retardation of the vehicle will thus be carried out gently owing to the fact that it will take a certain period of time to obtain a required pressure in the channel 15 after the valve 12 has been opened. It is to be noted that the described embodiment is adapted to be operated by compressed air.

Figure 2:
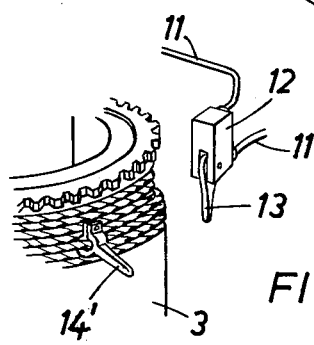
Figure 3:
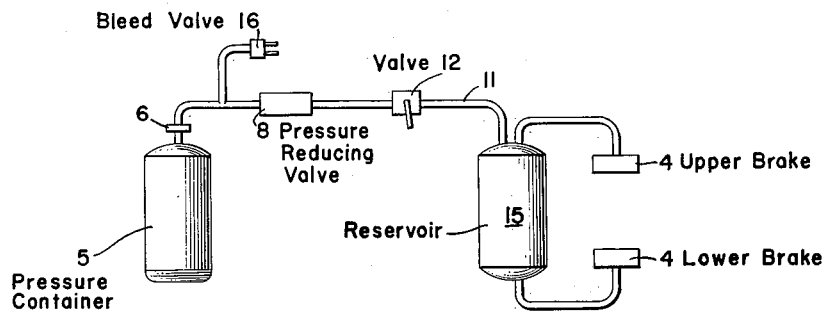
FIG. 3 is a diagrammatic representation of the pressure fluid supply and control devices.
Figure 4:
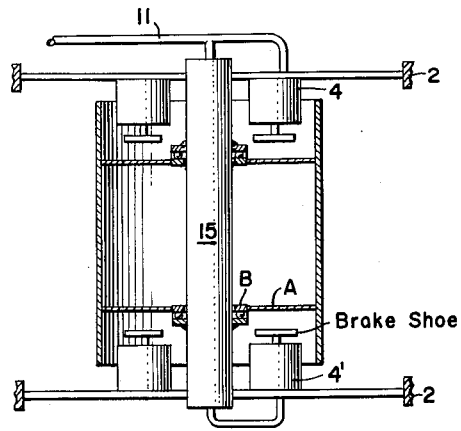
FIG. 4 is a diagrammatic showing of the fluid operated braking mechanism.
Figure 5:
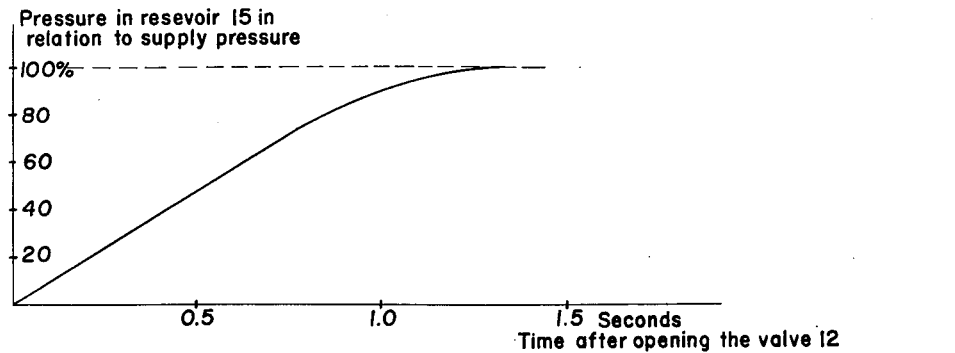
FIG. 5 is time-pressure diagram of the pressure in a reservoir in relation to fluid supply pressure.

Instead of having the studs or dogs attached to the drum itself corresponding studs or dogs 14', FIG. 2, may be secured to the proper brake wire 1.

The retardation of the airplane or other vehicle by the safety arresting means will thus be carried out in a suitable manner by giving the brake a delay dependent on time but independent of the length of the unwound wire and the lengths of said unwound portions may be very different, for instance, when a brake is situated on each end of the arresting net or the like.

We claim:
1. In an energy absorbing system including a cable wound on a rotatable drum the combination of fluid actuated brake means for applying a brake action on said drum, means for supplying fluid pressure to said brake means, said pressure supply means including a pressure fluid source, means for maintaining a selectable constant pressure of the fluid supply from said source, said fluid pressure supply means comprising a conduit between said pressure control means and said brake means, a shut-off valve in said conduit operable to take closed or open position, a receptacle connected to said conduit between said shut-off valve and said brake means for retarding the building up of pressure acting on said brake means, and means for moving said shut-off valve from its closed to its open position comprising dog means carried by said rotatable drum and adapted to engage the operating lever of the shut-off valve upon rotation of the drum for moving said lever to valve opened position.

2. In an energy absorbing system including a cable wound on a rotatable drum the combination of fluid actuated brake means for applying a brake action on said drum, means for supplying fluid pressure to said brake means, said pressure supply means including a pressure fluid source, means for maintaining a selectable constant pressure of the fluid supply from said source, said fluid pressure supply means comprising a conduit between said pressure control means and said brake means, a shut-off valve in said conduit operable to take closed or open position, a receptacle connected to said conduit between said shut-off valve and said brake means for retarding the building up of pressure acting on said brake means, said means for opening said shut-off valve comprises dog means carried by the cable wound on said drum and engageable with the operating lever of the valve upon rotation of the drum for moving said lever to valve opened position.

References Cited in the file of this patent
UNITED STATES PATENTS

| | | |
|---|---|---|
| 2,448,209 | Boyer et al. | Aug. 31, 1948 |
| 2,843,228 | Wysor | July 15, 1958 |
| 2,906,476 | Doolittle | Sept. 29, 1959 |